United States Patent
Ji

(10) Patent No.: US 11,868,763 B2
(45) Date of Patent: Jan. 9, 2024

(54) METHOD FOR IMPLEMENTING LINUX KERNEL HOT PATCH, ELECTRONIC DEVICE, AND COMPUTER READABLE MEDIUM

(71) Applicant: ZTE CORPORATION, Guangdong (CN)

(72) Inventor: Angang Ji, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/783,015

(22) PCT Filed: Nov. 16, 2020

(86) PCT No.: PCT/CN2020/129031
§ 371 (c)(1),
(2) Date: Jun. 7, 2022

(87) PCT Pub. No.: WO2021/115036
PCT Pub. Date: Jun. 17, 2021

(65) Prior Publication Data
US 2023/0016250 A1  Jan. 19, 2023

(30) Foreign Application Priority Data
Dec. 13, 2019 (CN) .......................... 201911283684.X

(51) Int. Cl.
*G06F 8/656* (2018.01)
*G06F 9/4401* (2018.01)
(Continued)

(52) U.S. Cl.
CPC ............ *G06F 8/656* (2018.02); *G06F 9/4406* (2013.01); *G06F 11/3644* (2013.01); *G06F 9/4486* (2018.02)

(58) Field of Classification Search
CPC .......................... G06F 8/60–66; G06F 9/4406
(Continued)

(56) References Cited

U.S. PATENT DOCUMENTS 7,472,384 B1  12/2008 Beloussov et al.
9,164,754 B1 * 10/2015 Pohlack .................. G06F 8/658
(Continued)

FOREIGN PATENT DOCUMENTS

CN  101882094 A  11/2010
CN  102982277 A  3/2013
(Continued)

OTHER PUBLICATIONS

Salls, Christopher, et al., Piston: Uncooperative Remote Runtime Patching, ACSAC '17: Proceedings of the 33rd Annual Computer Security Applications Conference, Dec. 2017, 13 pages, [retrieved on Sep. 7, 2023], Retrieved from the Internet: <URL:http://dl.acm.org/>.*

(Continued)

*Primary Examiner* — Geoffrey R St Leger
(74) *Attorney, Agent, or Firm* — Li & Cai Intellectual Property (USA) Office

(57) ABSTRACT

A method for implementing LINUX kernel hot patch, an electronic device and a computer readable medium, the method includes: modifying header instruction code of a patched function in an atomic operation mode, and jumping directly or indirectly from a patched function address to a patching function address to activate a patching function. The method for implementing LINUX kernel hot patch can achieve the activation of the patching function without restarting the LINUX system.

4 Claims, 11 Drawing Sheets

(51) Int. Cl.
*G06F 11/36* (2006.01)
*G06F 9/448* (2018.01)

(58) Field of Classification Search
USPC .................................................. 717/168–178
See application file for complete search history.

(56) References Cited

U.S. PATENT DOCUMENTS

| | | | |
|---|---|---|---|
| 10,310,863 B1 | 6/2019 | Poimboeuf et al. | |
| 2010/0205587 A1* | 8/2010 | Dai | G06F 8/656 |
| | | | 717/140 |

FOREIGN PATENT DOCUMENTS

| | | | | |
|---|---|---|---|---|
| CN | 105138341 A | 12/2015 | | |
| CN | 105988798 A | 10/2016 | | |
| EP | 2434394 A1 * | 3/2012 | ............... | G06F 8/67 |
| WO | WO-2015018302 A1 * | 2/2015 | .......... | G06F 11/1489 |

OTHER PUBLICATIONS

Arnold, Jeff, et al., Ksplice: Automatic Rebootless Kernel Updates, EuroSys '09: Proceedings of the 4th ACM European conference on Computer systems, Apr. 2009, 12 pages, [retrieved on Sep. 7, 2023], Retrieved from the Internet: <URL:http://dl.acm.org/>.*
WIPO, International Search Report dated Feb. 2, 2021.

* cited by examiner

| modify the first piece of instruction code of the patched function into a jump instruction code | —41 |
|---|---|

Fig. 4a

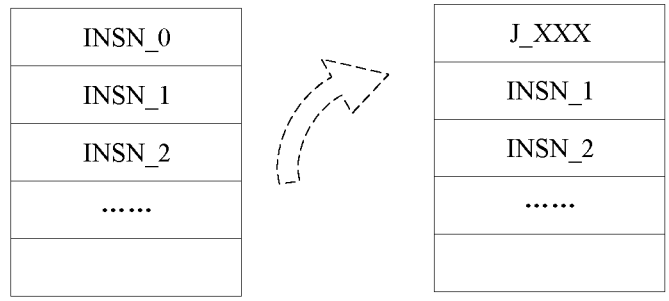

Fig. 4b

| modify the first piece of instruction code of the patched function into the jump instruction code, the jump instruction code being instruction code obtained by calculating according to the patched function and the relay space | —51 |
|---|---|

| implement in the relay space a jump from the relay space to the patching function | —52 |
|---|---|

Fig. 5a

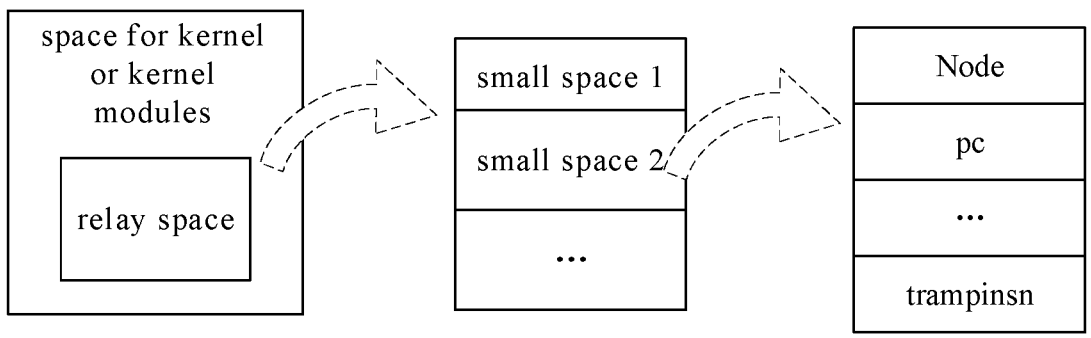

Fig. 5b

METHOD FOR IMPLEMENTING LINUX KERNEL HOT PATCH, ELECTRONIC DEVICE, AND COMPUTER READABLE MEDIUM

TECHNICAL FIELD

The embodiments of the present disclosure relate to the field of computer technology, and in particular to a method for implementing LINUX kernel hot patch, an electronic device, and a computer readable medium.

BACKGROUND

As the basic operating system of the communication software, the Linux system is loaded with more and more kernel driver modules as the application scenarios become more and more complex, which inevitably exposes the problem of kernel failure and/or kernel module failure. The traditional solution is to solve the problem of kernel failure and/or kernel module failure by "cold patch" method, that is, restart the system after replacing the kernel and/or kernel modules.

However, as communication networks become more and more widely used, there are more and more users of Linux system services, and users have higher and higher requirements for the stability of the Linux system. If the "cold patch" method is still used to solve the problem of kernel failure and/or kernel module failure, the system needs to be restarted, which will affect the life and work of users greatly, reduce the stability of the Linux system, and cause poor user experience.

SUMMARY

The embodiments of the present disclosure provide a method for implementing LINUX kernel hot patch, an electronic device, and a computer readable medium which can activate a patching function without restarting the LINUX system, ensure the stability of the LINUX system, and improve user experience.

In a first aspect, an embodiment of the present disclosure provides a method for implementing LINUX kernel hot patch, including: modifying header instruction code of a patched function in an atomic operation mode, and jumping directly or indirectly from a patched function address to a patching function address to activate a patching function.

In a second aspect, an embodiment of the present disclosure provides an electronic device including: one or more processors; a storage means having stored thereon one or more programs which, when executed by the one or more processors, cause the one or more processors to implement any of the methods described herein.

In a third aspect, an embodiment of the present disclosure provides a computer readable medium having stored thereon a program which, when executed by a processor, implements any of the claims 1 to 11 described herein.

The method for implementing LINUX kernel hot patch provided by the embodiments of the present disclosure modifies the header instruction code of the patched function in an atomic operation mode, jumps directly or indirectly from the patched function address to the patching function address, and achieves the activation of the patching function.

BRIEF DESCRIPTION OF DRAWINGS

The accompanying drawings, which are a part of the specification, are used to provide a further understanding of the embodiments of the present disclosure, and to explain the present disclosure together with the embodiments of the present disclosure, but do not constitute a limitation to the present disclosure. The above and other features and advantages will become more apparent to those skilled in the art from the description of detailed exemplary embodiments with reference to the drawings in which:

FIG. 4a is a flowchart of a method for implementing LINUX kernel hot patch according to an embodiment of the present disclosure;

FIG. 4b is a schematic diagram of a method for implementing LINUX kernel hot patch according to an embodiment of the present disclosure;

FIG. 5a is a flowchart of a method for implementing LINUX kernel hot patch according to an embodiment of the present disclosure;

FIG. 5b is a schematic diagram of the relay space division according to an embodiment of the present disclosure;

DETAIL DESCRIPTION OF EMBODIMENTS

Figure 1A:
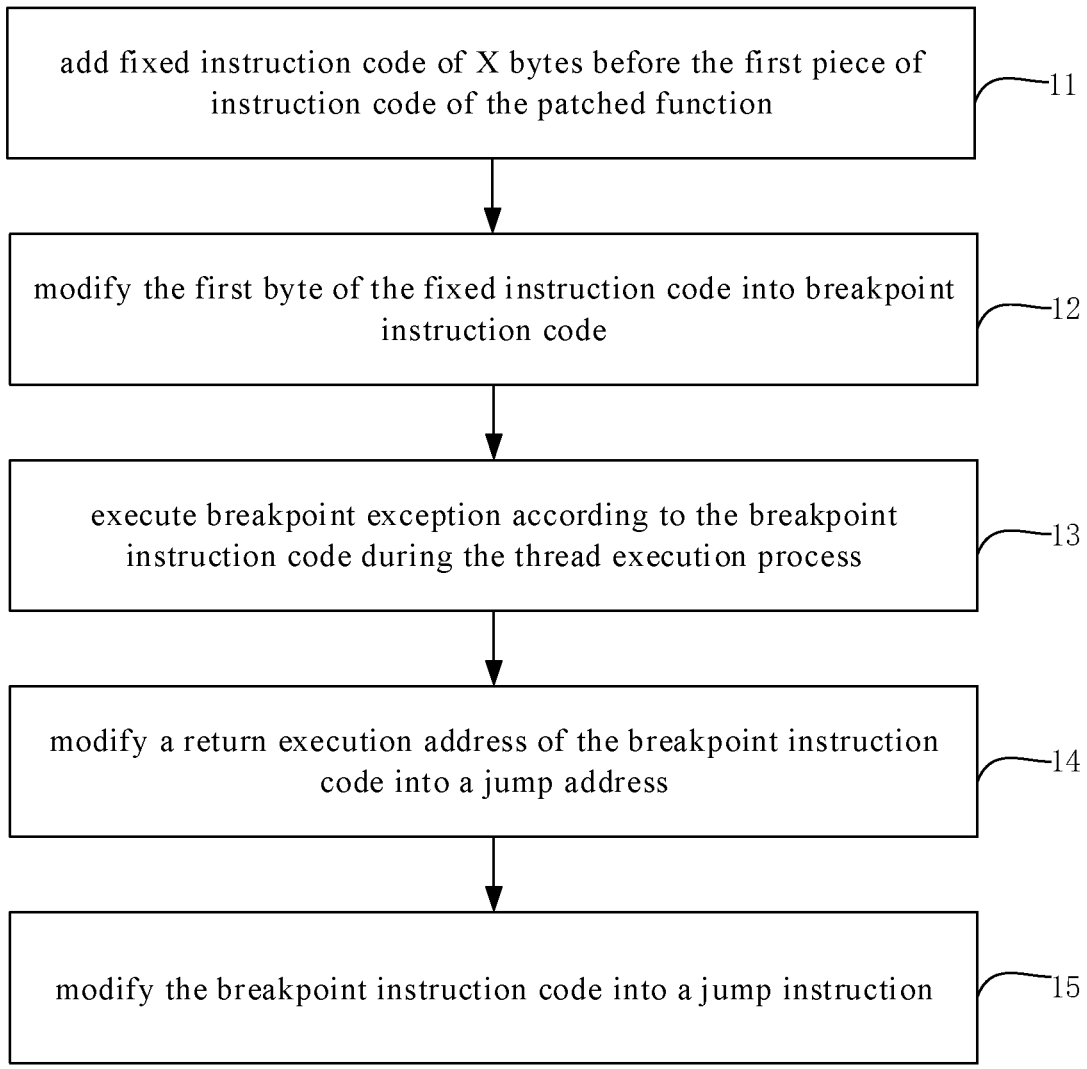
FIG. 1a is a flowchart of a method for implementing LINUX kernel hot patch according to an embodiment of the present disclosure.

In order to make those skilled in the art better understand the technical solutions of the present disclosure, a method for implementing LINUX kernel hot patch, an electronic device, and a computer readable medium provided by the present disclosure will be described in detail with reference to the drawings.

Exemplary embodiments are described more fully hereinafter with reference to the drawings, but which may be implemented in different forms and should not be construed as limited to the embodiments set forth herein. Rather, these embodiments are provided so that this disclosure will be thorough and complete, and will fully convey the scope of the disclosure to those skilled in the art.

As used herein, the term "and/or" includes any and all combinations of one or more of the associated listed items.

The terminology used herein is used to describe specific embodiments only and is not intended to limit the present disclosure. As used herein, the singular forms "a" and "the" are intended to include the plural forms as well, unless the context clearly dictates otherwise. It will also be understood that, when the terms "including" and/or "made of" are used in this specification, the stated features, integers, steps, operations, elements and/or components are specified to be present, but do not preclude the presence or addition of one or more other features, integers, steps, operations, elements, components, and/or groups thereof.

The embodiments described herein may be described with reference to plan views and/or cross-sectional views and using the idealized schematic diagrams of the present disclosure. Accordingly, the exemplary illustrations may be modified according to manufacturing techniques and/or tolerances. Therefore, the embodiments are not limited to the embodiments shown in the drawings, but include modifications of configurations formed based on manufacturing processes. Thus, the regions illustrated in the figures are schematic and the shapes of regions illustrated in the figures are illustrative of the specific shapes of regions of elements, but are not intended to be limiting.

Unless otherwise defined, all terms (including technical and scientific terms) used herein have the same meaning as commonly understood by one of ordinary skill in the art. It will also be understood that, terms such as those defined in commonly used dictionaries should be construed as having meanings consistent with their meanings in the context of the related art and this disclosure, and will not be construed as having idealized or over-formal meanings, unless explicitly so defined herein.

The LINUX system is a basic operating system for communication software. According to the characteristics of the instruction sets of the designed and manufactured processors, the architectures supported by the current Linux system mainly include the Complex Instruction Set Computer (CISC) architecture and the Reduced Instruction Set Computer (CISC) architecture. Among them, the CISC architecture includes the X86 architecture, etc.; the RISC architecture includes the Advanced RISC Machines (ARM) architecture, the Microprocessor without Interlocked Piped Stages (MIPS) architecture, and PowerPC processor (Performance Optimization With Enhanced RISC—Performance Computing, PPC) architecture, etc. As the application scenarios become more and more complex, the LINUX system is loaded with more and more kernel driver modules, which inevitably exposes the problem of kernel failure and/or kernel module failure. In order to solve the problem of kernel failure and/or kernel module failure, patching the defective kernel and/or kernel modules is required. The traditional solution is to solve the problem of kernel failure and/or kernel module failure by "cold patch" method, that is, restart the system after replacing the kernel and/or kernel modules. However, this will affect the life and work of users greatly, reduce the stability of the LINUX system, and cause poor user experience. Therefore, in order to ensure the stability of the LINUX system, it is desired to replace the defective functions of the kernel and/or the kernel modules without restarting the system, that is, to perform a "hot patching" operation on the kernel and/or the kernel modules. However, in the current LINUX system, the method for implementing hot patch in the X86 architecture is inefficient, and other architectures are difficult to support the operation of "hot patching".

In view of the defects of the current LINUX system in implementing the "hot patching" operation, an embodiment of the present disclosure discloses a method for implementing LINUX kernel hot patch. The method is applied to a patch management module, and the patch management module is installed in the kernel before the patching operation is performed.

The process of installing the patch management module includes: first, confirming that the compile time checking related to the processor architecture is passed, secondly confirming that the relay regions related to the processor architecture are successfully initialized, confirming that the breakpoint exceptions related to the processor are registered successfully and registering the kernel module state transition callback, focusing on the installation and uninstallation of patch modules, and finally creating the sysfs root nodes of the patches.

By compiling and installing different patch modules in the patch management module, the patching operation on the kernel and/or the kernel modules can be realized. A patch module stores patch description information, where the patch description information includes the name of the patched function, the address of the patching function, the patch mode, etc. It should be noted that the patch management module can provide a patch interface to compile the patch module, and can also use Shell commands to install or uninstall the compiled patch module. After calling the patch interface of the patch management module to compile the patch module, the patch module can be installed and the patch description information stored in the patch module can be parsed by calling the registration patch interface and the activation patch interface successively in the patch module. When it returns to normal, it indicates that the function of the patch module has taken effect. It should also be noted that, since the hot patch management system is created in the sysfs, operations such as activation, deactivation and uninstallation of the patching function in the patch module can be performed by manually operating the sysfs files. The activation interface, the deactivation interface, and the uninstallation interface are respectively: echo 1>/sys/kernel/patch management module name/patch module name/enabled, echo 0>/sys/kernel/patch management module name/patch module name/enabled, and echo 0>/sys/kernel/patch management module name/patch module name/installed.

An embodiment of the present disclosure provides a method for implementing LINUX kernel hot patch including the following step: modifying header instruction code of a patched function in an atomic operation mode, and jumping directly or indirectly from a patched function address to a patching function address to activate a patching function.

The atomic operation mode is an operation mode in which the operation process is not interrupted. An atomic operation includes one or more operation steps, and the sequence of the operation steps cannot be disrupted during the operation process. That is to say, the atomic operation mode requires that the operation steps are executed continuously and completely, and the operation process is not interrupted or abnormally interrupted. In this embodiment, atomic operations include physical atomic operations and logical atomic operations.

In addition, the patched function is a defective function in the LINUX system kernel or kernel modules, and the patching function is a replacement function of the patched function. During the thread calling process of the kernel or kernel modules, the patching function can realize the function of the patched function, and at the same time can remedy the defects existing in the patched function. The patched function address is the address of the code segment space where the patched function is located; the patching function address is the address of the code segment space where the patching function is located, and the code segment space is located in the kernel and/or kernel modules.

It should be noted that the header instruction code of the patched function includes the first piece of instruction code and/or the second piece of instruction code of the patched function. By modifying the header instruction code of the patched function, jumping directly or indirectly from the patched function address to the patching function address can be realized, thereby realizing the activation of the patching function. In an embodiment, if the activated patching function cannot meet the requirement of thread calling, the activated patching function is desired to be removed, that is, the header instruction code of the patched function that has been modified is restored to the header instruction code before modification. In another embodiment, in order to facilitate the removal of the activated patching function, before modifying the header of the patched function in the atomic operation mode, the header instruction code of the patched function is also backed up, so that the modified header instruction code of the patched function can be accurately and quickly restored to the header instruction code before modification.

FIG. 1a is a flowchart of a method for implementing LINUX kernel hot patch according to an embodiment of the present disclosure. The method for implementing LINUX kernel hot patch realizes the jump to the patching function by adding fixed instruction code of bytes of fixed length to the header of the patched function.

In some embodiments, as shown in FIG. 1a, the method for implementing LINUX kernel hot patch includes steps 11 to 15.

At step 11, fixed instruction code of X bytes is added before the first piece of instruction code of the patched function.

Where X is an integer greater than 4. It should be noted that the purpose of adding the fixed instruction code of X bytes before the first piece of instruction code of the patched function is to perform a patching operation on the patched function and realize the activation of the patching function. Therefore, in some embodiments, before adding the fixed instruction code of X bytes, it is judged whether the patched function already has another activated patching function.

In an implementation, before the adding fixed instruction code of X bytes before the first piece of instruction code of the patched function, it is judged whether there is fixed instruction code before the first piece of instruction code of the patched function; if so, it indicates that the patched function already has an activated patching function, and thus modifying the header instruction code of the patched function is stopped. If not, it indicates that the patched function does not have an activated patching function, and thus the patching operation can be performed on the patched function, that is, the fixed instruction code of X bytes can be added before the first piece of instruction code of the patched function to activate the patching function.

In an implementation, if modifying the header instruction code of the patched function is stopped since there is fixed instruction code before the first piece of instruction code of the patched function, the header instruction code of the activated patching function may be modified to perform the patching operation on the activated patching function.

At step 12, the first byte of the fixed instruction code is modified into breakpoint instruction code.

The breakpoint instruction code can intercept the thread of calling the patched function by the kernel call stack so that the thread cannot execute the instruction code after the breakpoint instruction code.

At step 13, breakpoint exception is executed according to the breakpoint instruction code during the thread execution process.

The thread execution process is the calling process of calling the patched function by the kernel call stack. The breakpoint exception is an operation triggered by a breakpoint during the execution of the thread, and the operation is registered in the patch management module. When the operation is registered, a corresponding operation process is hooked by modifying the corresponding register context; where, modifying the corresponding register context includes writing the patching function into the register.

Figure 2:
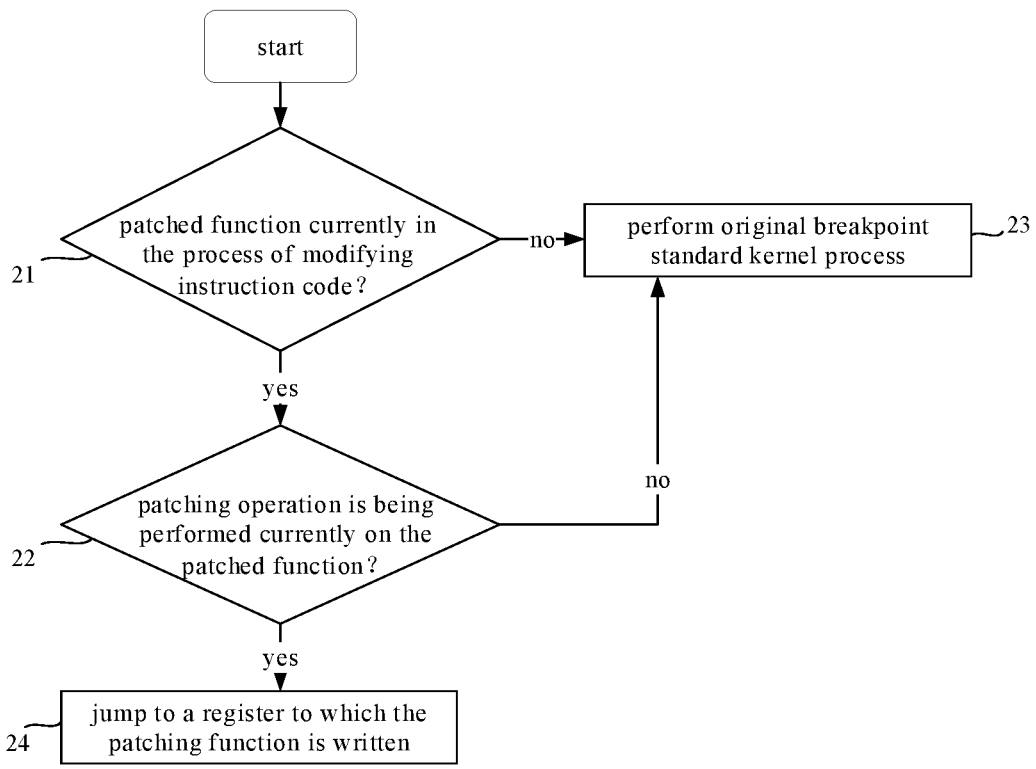
FIG. 2 is a flowchart of a breakpoint exception hook operation according to an embodiment of the present disclosure.

In an implementation, as shown in FIG. 2, the operation process of the hooking includes steps 21 to 24.

At step 21, it is judged whether the patched function is currently in the process of modifying instruction code, and if the patched function is not currently in the process of modifying instruction code, then step 23 is executed; if the patched function is currently in the process of modifying instruction code, then step 22 is executed.

At step 22, it is judged whether a patching operation is being performed currently on the patched function, and if the patching operation is not performed on the patched function, then step 23 is executed; if the patching operation is being performed currently on the patched function, then step 24 is executed.

At step 23, an original breakpoint standard kernel process is performed.

At step 24, it is jumped to a register to which the patching function is written.

When the kernel call stack calls the patched function, the breakpoint exception is executed by the breakpoint instruction code. It should be noted that, during the thread execution process, encountering a breakpoint is a small probability event. Therefore, in a short period of time, it is possible to handle the breakpoint exception by hooking the operation process in the relevant register, so that the thread execution process is not interrupted, thereby facilitating the subsequent step of activating the patching function.

At step 14, a return execution address of the breakpoint instruction code is modified into a jump address.

The jump address is determined according to the address difference between the patching function and the patched function, and the jump address is stored in the last (X−1) bytes of the fixed instruction code.

At step 15, the breakpoint instruction code is modified into a jump instruction The breakpoint instruction code is in the first byte of the fixed instruction code. Thus, the jump instruction obtained by modifying the breakpoint instruction code is also in the first byte of the fixed instruction code. In addition, since the jump address is stored in the last (X−1) bytes of the fixed instruction code, the jump instruction code and the last (X−1) bytes of the fixed instruction code together form a complete jump instruction code with a length of X bytes. Since X is an integer greater than 4, the last (X−1) bytes can store either the address having the length required for a short jump or the address having the length required for a long jump. According to the jump instruction code with the length of X bytes, jumping directly from the patched function to the patching function can be done to realize the activation of the patching function.

Taking FIG. 1b as an example, the steps of the method for implementing LINUX kernel hot patch in FIG. 1a will be described in detail. First, a Nop instruction with a length of 5 bytes is added before the first piece of instruction code INSN_1 of the patched function, and the first byte of the Nop instruction is modified into the breakpoint instruction code BRK(cc), so that the breakpoint exception is executed according to the breakpoint instruction code BRK(cc) during the thread execution process; secondly, an offset value is calculated by an offset instruction according to the unconditional transfer instruction (jmpq) format, and the offset value is the jump address from the patched function to the patching function; then, the return execution address of the breakpoint instruction code, that is, the last 4 bytes of the Nop instruction, is modified into the offset value; finally, the breakpoint instruction code BRK(cc) is modified into the jump instruction jumpq(e9). The jump instruction jumpq(e9) and the offset value in the last 4 bytes of the Nop instruction form a complete jump instruction code so as to implement a complete jump call, and jumping directly from the patched function address to the patching function address can be done, thereby realizing the activation of the patching function.

Figure 3A:
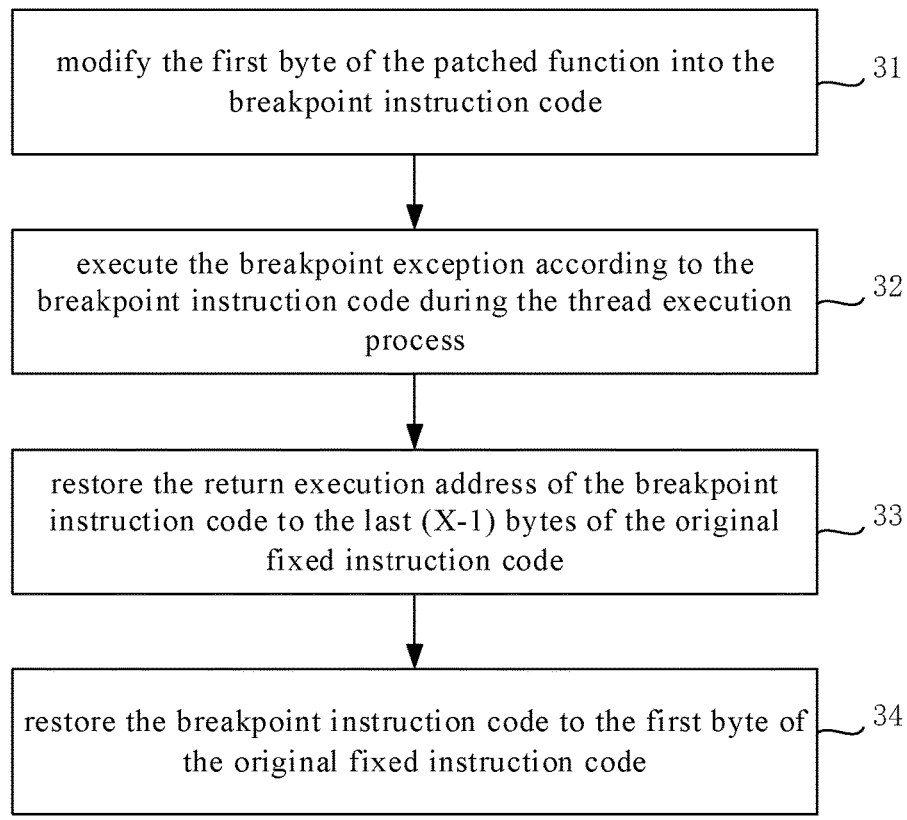
FIG. 3a is a flowchart of a method for removing an activated patching function according to an embodiment of the present disclosure.

In an implementation, as shown in FIG. 3a, the step of removing an activated patching function corresponding to FIG. 1a includes steps 31 to 34.

At step 31, the first byte of the patched function is modified into the breakpoint instruction code.

At step 32, the breakpoint exception is executed according to the breakpoint instruction code during the thread execution process.

At step 33, the return execution address of the breakpoint instruction code is restored to the last (X−1) bytes of the original fixed instruction code, where X is an integer greater than 4.

At step 34, the breakpoint instruction code is restored to the first byte of the original fixed instruction code.

Figure 1B:
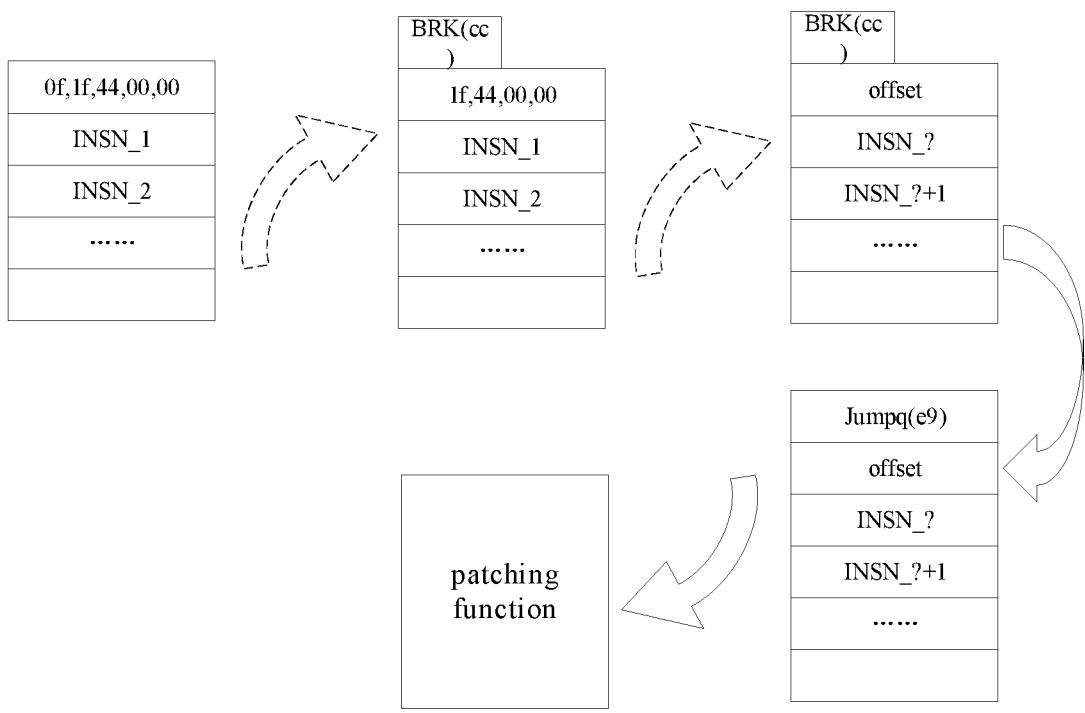
FIG. 1b is a schematic diagram of a method for implementing LINUX kernel hot patch according to an embodiment of the present disclosure.
Figure 3B:
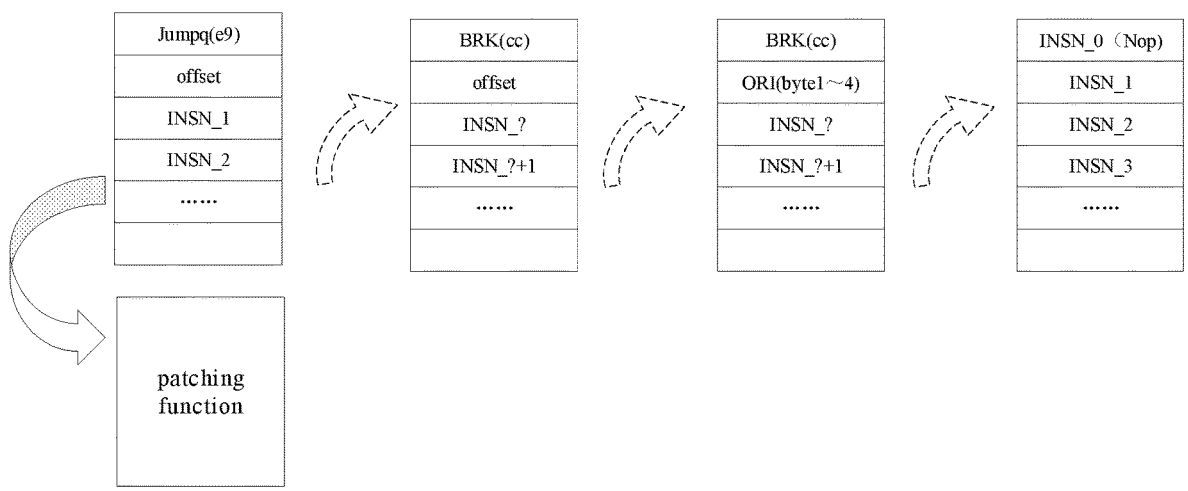
FIG. 3b is a schematic diagram of a method for removing an activated patching function according to an embodiment of the present disclosure.

Taking FIG. 3b as an example, the step of removing the patching function activated in FIG. 1b is correspondingly described. First, the first byte of the patched function is modified into the breakpoint instruction code BRK(cc), the breakpoint exception is executed according to the breakpoint instruction code during the thread execution process. It should be noted that at this time, the first byte of the patched function is the jump instruction jumpq(e9); secondly, the return execution address of the breakpoint instruction code, that is, the offset value, is restored to the last 4 bytes of the added Nop instruction by using an ORI instruction; finally, the breakpoint instruction code is restored to the first byte of the Nop instruction. At this point, the Nop instruction with the length of 5 bytes added in the patched function has been restored, and the Nop instruction does not affect the thread to call the patched function. Therefore, the activated patching function in FIG. 1b is successfully removed.

In the method for implementing LINUX kernel hot patch provided by the embodiment of the present disclosure, firstly, a fixed instruction code of X bytes is added before the first piece of instruction code of the patched function, and the first byte of the fixed instruction code is modified into a breakpoint instruction code, so that the breakpoint exception is executed according to the breakpoint instruction code during the thread execution process; secondly, the return execution address of the breakpoint instruction code is modified into a jump address, and the breakpoint instruction code is modified into a jump instruction, and thus jumping directly from the patched function address to the patching function address can be done, thereby realizing the activation of the patching function.

It should be noted that, the breakpoint exception is registered before the header instruction of the patched function is modified, thus, after the first byte of the fixed instruction code is modified into the breakpoint instruction code, even if the breakpoint instruction code is encountered during the thread execution process, the breakpoint exception can be executed according to the breakpoint instruction code, and the thread will not be interrupted. That is, in the embodiment of the present disclosure, the modification process of the header instruction of the patched function realizes the logical atomic operation, and the LINUX system can activate the patching function without restarting, thereby realizing the LINUX kernel hot patch and ensuring the stability of the LINUX system.

It should also be noted that, in the embodiment of the present disclosure, the modification process of the header instruction of the patched function only involves the modification of one piece of instruction code, the modification process is simple, and the modification process does not involve the backtracking of the kernel call stack, which improves the efficiency of implementing LINUX kernel hot patch.

FIG. 4a is a flowchart of a method for implementing LINUX kernel hot patch according to an embodiment of the present disclosure. This method for implementing LINUX kernel hot patch is aimed at the short jump mode in the RISC architecture, that is, the distance between the patched function and the patching function is relatively close, and the jump can be realized by modifying just one piece of instruction code of the patched function.

As shown in FIG. 4a, the method for implementing LINUX kernel hot patch includes: step 41, modifying the first piece of instruction code of the patched function into a jump instruction code.

The jump instruction code is the instruction code obtained by calculating according to the patching function and the patched function. The jump instruction code includes a jump address, and the jump address is determined according to the difference between the patching function address and the patched function address. According to the jump instruction code, jumping directly from the patched function to the patching function can be done to realize the activation of the patching function.

It should be noted that modifying the first piece of instruction code of the patched function into the jump instruction code is to perform a patching operation on the patched function and realize activation of the patching function. Therefore, in some embodiments, before modifying the first piece of instruction code of the patched function into the jump instruction code, it is judged whether the patching operation can be performed on the patched function.

In an implementation, the assembly instruction code of the patched function is parsed, and it is judged whether there is an instruction code sequence for jumping to the beginning of the patched function in the assembly instruction code. If there is an instruction code sequence for jumping to the beginning of the patched function, it indicates that the patching operation cannot be performed on the patched function, thus stopping modifying the header instruction code of the patched function; if there is no instruction code sequence for jumping to the beginning of the patched function, it indicates that the patching operation can be performed on the patched function, that is, the first piece of instruction code of the patched function can be modified into the jump instruction code to activate the patching function. It should be noted that, in all functions, the probability that there is an instruction code sequence for jumping to the beginning of the patched function in the assembly instruction code is extremely low.

In an implementation, when the header instruction code of the patched function is stopped from being modified due to an instruction code sequence for jumping to the beginning of the patched function existing in the patched function, the patch management module may give a prompt: it is recommended to perform a patching operation on the calling function existing in the patched function.

Taking FIG. 4b as an example, the step of the method for implementing LINUX kernel hot patch in FIG. 4a will be described in detail. The first piece of instruction code INSN_0 of the patched function is modified into the jump instruction code J_XXX. The jump instruction code J_XXX is the instruction code obtained by calculating according to the patching function and the patched function. The jump instruction code includes a jump address, and the jump address is determined according to the difference between the patching function address and the patched function address. According to the jump instruction code J_XXX, jumping directly from the patched function to the patching function can be done to realize the activation of the patching function.

In an implementation, the step of removing the activated patching function corresponding to FIG. 4a includes: restoring the jump instruction code to the first piece of the instruction code before the patched function is modified.

In the method for implementing LINUX kernel hot patch provided by the embodiment of the present disclosure, the activation of the patching function is realized by modifying the first piece of instruction code of the patched function into a jump instruction code. It should be noted that, since the modification process of the header instruction of the patched function will not cause the thread to be interrupted, the modification process realizes the physical atomic operation. Therefore, the LINUX system can activate the patching function without restarting, thereby realizing the LINUX kernel hot patch and ensuring the stability of the LINUX system.

It should also be noted that, in the embodiment of the present disclosure, the modification process of the header instruction of the patched function only involves the modification of one piece of instruction code, and thus the modification process is simple, and the modification process does not involve the backtracking of the kernel call stack, which improves the efficiency of implementing LINUX kernel hot patch.

FIG. 5a is a flowchart of a method for implementing LINUX kernel hot patch according to an embodiment of the present disclosure. This method for implementing LINUX kernel hot patch is aimed at the long jump mode in the RISC architecture, that is, the distance between the patched function and the patching function is relatively far, and the jump from the patched function address to the patching function address cannot be realized by one instruction. In order to reduce the instructions involved in modifying the patched function as much as possible, before modifying the header instruction of the patched function, a relay space for the patched function is applied for. The relay space is a code segment space reserved in the kernel and/or the kernel modules that can implement a jump from the patched function by one piece of instruction, and the relay space is initialized by the patch management module.

As shown in FIG. 5a, the method for implementing LINUX kernel hot patch includes steps 51 and 52.

At step 51, the first piece of instruction code of the patched function is modified into the jump instruction code.

The jump instruction code is instruction code obtained by calculating according to the patched function and the relay space. According to the jump instruction code, the jump can be done from the patched function to the relay space. In addition, the jump instruction code includes a jump address, and the jump address is determined according to the difference between the patching function address and the relay space address. In the relay space, there is target jump instruction code for jumping from the relay space address to the patching function address.

It should be noted that modifying the first piece of instruction code of the patched function into the jump instruction code is to perform a patching operation on the patched function and realize activation of the patching function. Therefore, in some embodiments, before modifying the first piece of instruction code of the patched function into the jump instruction code, it is judged whether the patching operation can be performed on the patched function.

In an implementation, the assembly instruction code of the patched function is parsed, and it is judged whether there is an instruction code sequence for jumping to the beginning of the patched function in the assembly instruction code. If there is an instruction code sequence for jumping to the beginning of the patched function, it indicates that the patching operation cannot be performed on the patched function, thus stopping modifying the header instruction code of the patched function; if there is no instruction code sequence for jumping to the beginning of the patched function, it indicates that the patching operation can be performed on the patched function, that is, the first piece of instruction code of the patched function can be modified into the jump instruction code to activate the patching function. It should be noted that, in all functions, the probability that there is an instruction code sequence for jumping to the beginning of the patched function in the assembly instruction code is extremely low.

In an implementation, when the header instruction code of the patched function is stopped from being modified due to an instruction code sequence for jumping to the beginning of the patched function existing in the patched function, the patch management module may give a prompt: it is recommended to perform a patching operation on the calling function existing in the patched function.

At step 52, a jump from the relay space to the patching function is implemented in the relay space.

The relay space needs to be set in advance by the patch management module. When the relay space is set, the target jump instruction code is written in the relay space, and the target jump instruction code is the instruction code obtained by calculating according to the relay space and the patching function. The target jump instruction code includes a target jump address, and the target jump address is determined according to the difference between the relay space address and the patching function address. It should also be noted that, as shown in FIG. 5b, the relay space can be divided into small spaces of corresponding length according to the type of the target jump instruction, where the types of the target jump instructions include long jump instructions and short jump instructions. In addition, the small space includes several locations for storing instruction code or instruction code addresses.

Taking FIG. 5c as an example, the steps of the method for implementing LINUX kernel hot patch in FIG. 5a will be described in detail. First, the first piece of instruction code INSN_0 of the patched function is modified into the jump instruction code J_XXX. It should be noted that the jump instruction code J_XXX is the instruction code obtained by calculating according to the patched function and the relay space. The jump can be done from the patched function to the relay space according to the jump instruction code. There is a jump register included in the relay space, and the target jump instruction code is written in the jump register. The target jump instruction code is the instruction code obtained by calculating according to the relay space and the patching function. Therefore, in the relay space, a jump from the relay space to the patching function can be realized in the relay space so as to activate the patching function.

Figure 5C:
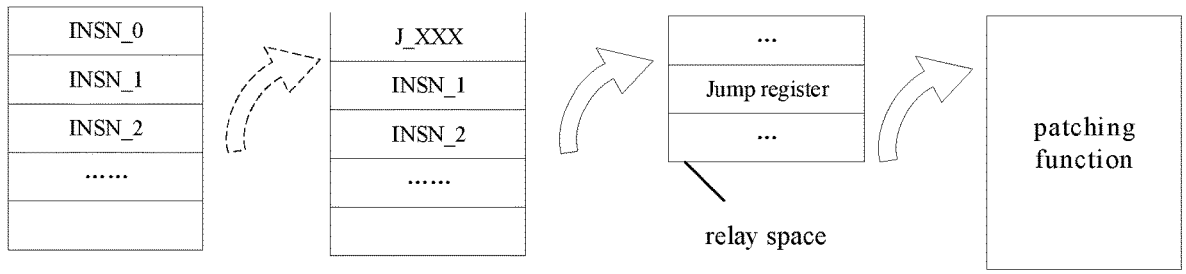
FIG. 5c is a schematic diagram of a method for implementing LINUX kernel hot patch according to an embodiment of the present disclosure.
Figure 6A:
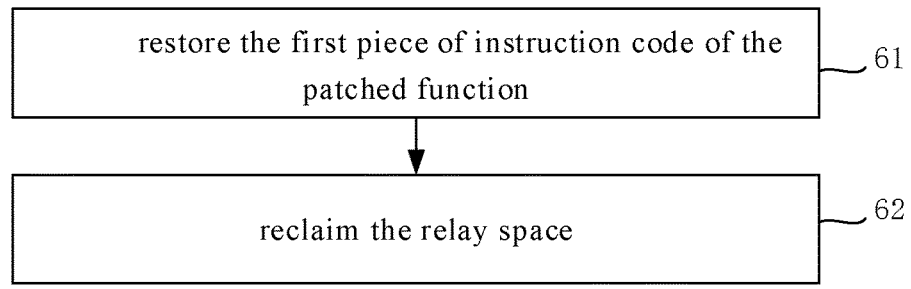
FIG. 6a is a flowchart of a method for removing an activated patching function according to an embodiment of the present disclosure.

In an implementation, as shown in FIG. 6a, the step of removing the activated patching function corresponding to FIG. 5a includes steps 61 and 62.

At step 61, the first piece of instruction code of the patched function is restored.

At step 62, the relay space is reclaimed.

Figure 6B:
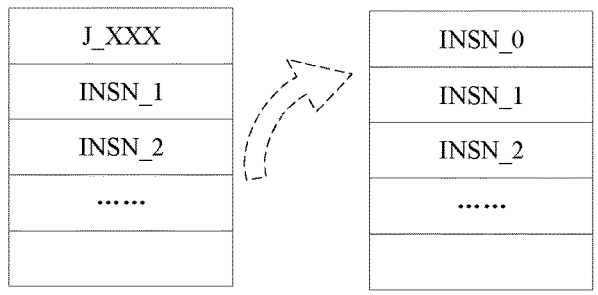
FIG. 6b is a schematic diagram of a method for removing an activated patching function according to an embodiment of the present disclosure.

Taking FIG. 6b as an example, the step of removing the patching function activated in FIGS. 4b and 5c is correspondingly described. The first piece of instruction code of the patched function is restored. It should be noted that the first piece of instruction code of the current patched function is the jump instruction code J_XXX, and restoring the first piece of instruction code of the patched function is to restore the jump instruction code J_XXX to the original first piece of instruction code of the patched function INSN_0. At this point, the thread resumes the calling to the patched function, and the patching functions activated in FIGS. 4b and 5b are successfully removed.

Figure 7:
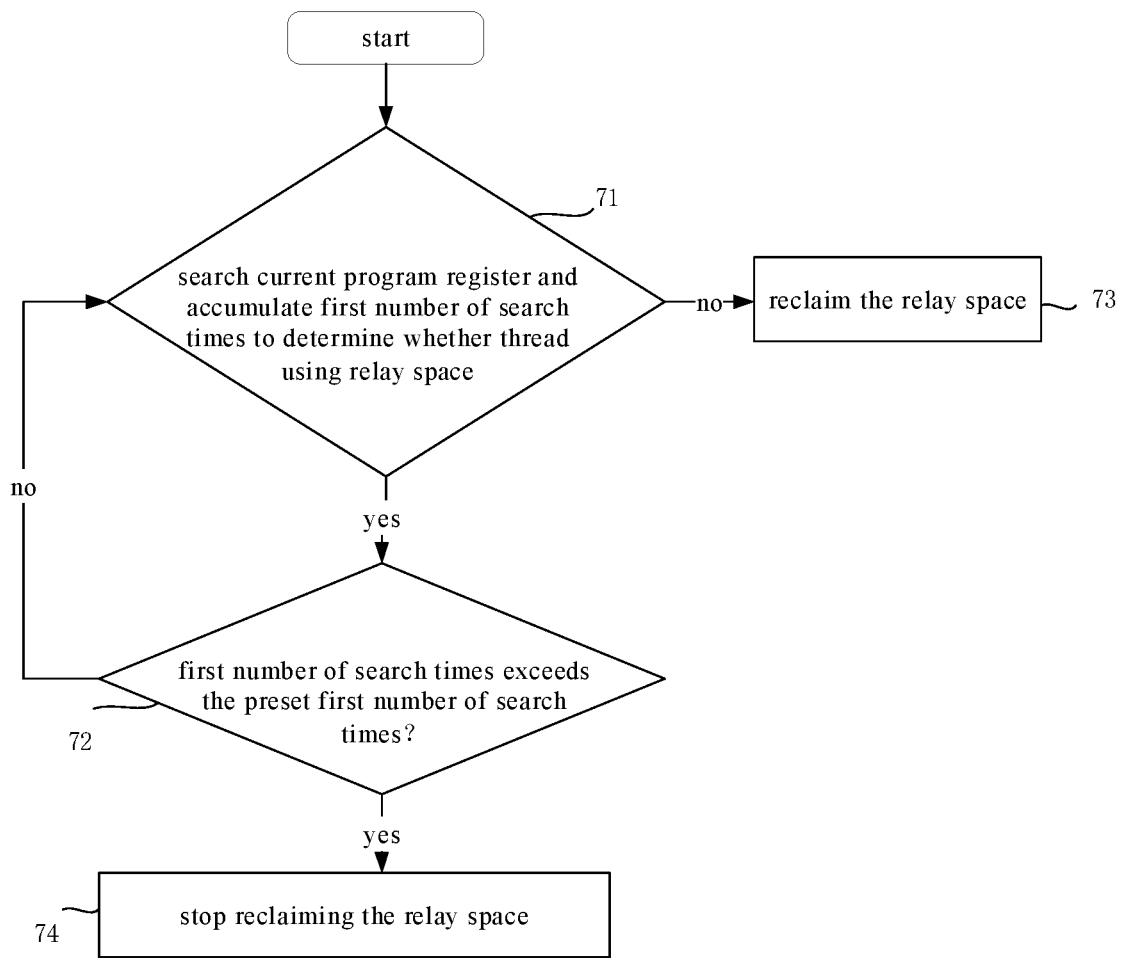
FIG. 7 is a flowchart of a backtracking method of relay space according to an embodiment of the present disclosure.

It should be noted that, after restoring the first piece of instruction code of the patched function in step 61, the calling to the patching function has been disconnected, but the relay space may continue to be used. Therefore, in some embodiments, the relay space is backtracked before it is reclaimed, and when backtracking is performed, the patched function address is used as the key value to perform a search to judge whether the relay space is still being used. As shown in FIG. 7, the steps of performing the relay space backtracking include steps 71 to 74.

At step 71, the current program register is searched for and the first number of search times is accumulated to determine whether there is a thread using the relay space, and if there is a thread using the relay space, then step 72 is executed; if there is no thread using the relay space, then step 73 is executed.

At step 72, it is judged whether the first number of search times exceeds the preset first number of search times, and if it exceeds the preset first number of search times, then reclaiming the relay space is stopped; if it does not exceed the preset first number of search times, then the process returns to step 71.

At step 73, the relay space is reclaimed.

At step 74, reclaiming the relay space is stopped.

In the method for implementing LINUX kernel hot patch provided by the embodiment of the present disclosure, the activation of the patching function is realized by modifying the first piece of instruction code of the patched function into a jump instruction code. It should be noted that, since the modification process of the header instruction of the patched function will not cause the thread to be interrupted, the modification process realizes the physical atomic operation. Therefore, the LINUX system can activate the patching function without restarting, thereby realizing the LINUX kernel hot patch and ensuring the stability of the LINUX system.

It should also be noted that, in the embodiment of the present disclosure, the modification process of the header instruction of the patched function only involves the modification of one piece of instruction code, the modification process is simple, and the modification process does not involve the backtracking of the kernel call stack, which improves the efficiency of implementing LINUX kernel hot patch.

Figure 8A:
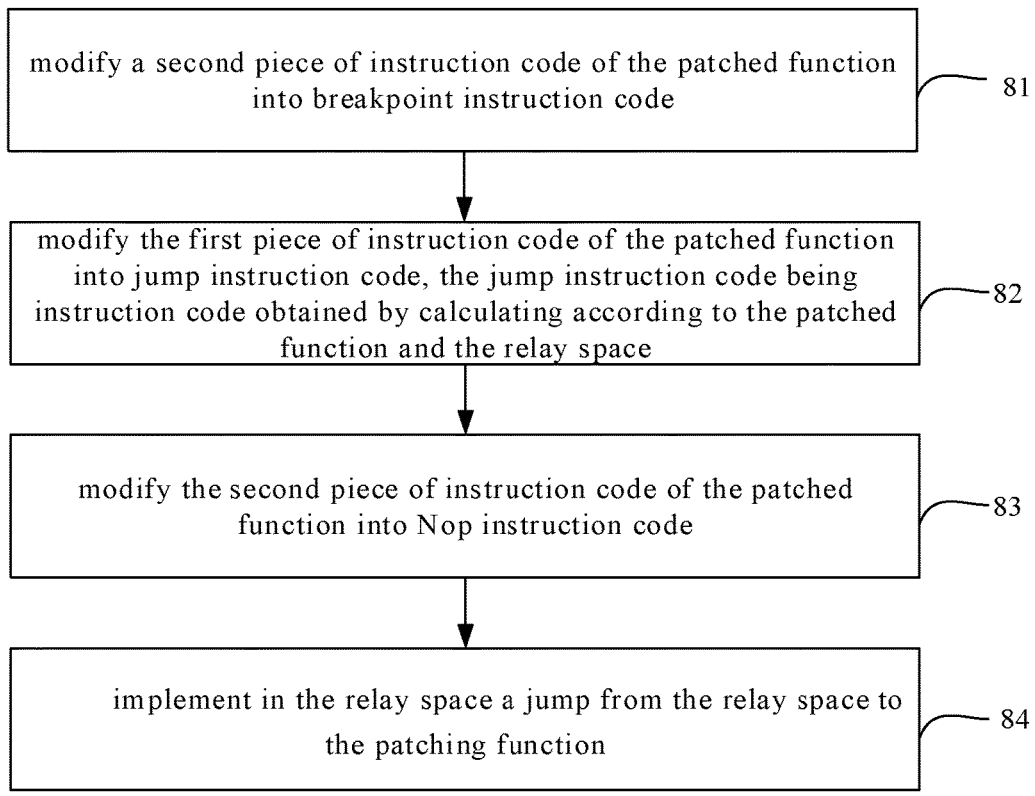
FIG. 8a is a flowchart of a method for implementing LINUX kernel hot patch according to an embodiment of the present disclosure.

FIG. 8a is a flowchart of a method for implementing LINUX kernel hot patch according to an embodiment of the present disclosure. This method for implementing LINUX kernel hot patch is aimed at the RISC architecture with a branch delay slot attribute, that is, the instructions of the patched function include the delay slot, and the instructions in the delay slot are preferentially executed during the thread execution process. In addition, in order to reduce the instructions involved in modifying the patched function as much as possible, before modifying the header instruction of the patched function, a relay space for the patched function is applied for. The relay space is a code segment space reserved in the kernel and/or the kernel modules that can implement a jump from the patched function by one piece of instruction, and the relay space is initialized by the patch management module.

As shown in FIG. 8a, the method for implementing LINUX kernel hot patch is applicable for the case where the first piece of instruction of the patched function contains a delay slot, and the method includes steps 81 to 84.

At step 81, a second piece of instruction code of the patched function is modified into breakpoint instruction code.

The breakpoint instruction code can intercept the thread of calling the patched function by the kernel call stack.

It should be noted that, since the first piece of instruction of the current patched function contains a delay slot, when the kernel call stack calls the patched function, the instruction code in the delay slot will be executed first, and then the second piece of instruction code of the patched function will be executed. Therefore, in order to intercept the thread of calling the patched function by the kernel call stack, the second piece of instruction code of the patched function is modified into a breakpoint instruction code. The breakpoint instruction code can make the thread unable to execute the instruction code after the breakpoint instruction code, and execute the breakpoint exception according to the breakpoint instruction code during the thread execution process.

The breakpoint exception is an operation triggered by a breakpoint during the execution of the thread, and the operation is registered in the patch management module. When the operation is registered, the corresponding operation process is hooked by modifying the corresponding register context; where modifying the corresponding register context includes writing the patching function into the register.

In an implementation, the operation process of the hooking includes: judging whether it is currently in the process of modifying the instruction code, if it is not in the process of modifying the instruction code, then performing the original breakpoint standard kernel process; if it is in the process of modifying the instruction code, then judging whether a patching operation is being performed on the function that currently has the breakpoint, if the patching operation is not being performed, performing the original breakpoint standard kernel process; if the patching operation is currently being performed, jumping to the register to which the patching function is written.

It should be noted that modifying the second piece of instruction code of the patched function into a jump instruction code is to perform a patching operation on the patched function and realize activation of the patching function. Therefore, in some embodiments, before modifying the second piece of instruction code of the patched function into a jump instruction code, it is judged whether the patching operation can be performed on the patched function.

In an implementation, the assembly instruction code of the patched function is parsed, and it is judged whether there is an instruction code sequence for jumping to the beginning of the patched function in the assembly instruction code. If there is an instruction code sequence for jumping to the beginning of the patched function, it indicates that the patching operation cannot be performed on the patched function, thus stopping modifying the header instruction code of the patched function; if there is no instruction code sequence for jumping to the beginning of the patched function, it indicates that the patching operation can be performed on the patched function, that is, the second piece of instruction code of the patched function can be modified into the jump instruction code to activate the patching function. It should be noted that, in all functions, the probability that there is an instruction code sequence for jumping to the beginning of the patched function in the assembly instruction code is extremely low.

In an implementation, when the header instruction code of the patched function is stopped from being modified due to an instruction code sequence for jumping to the beginning of the patched function existing in the patched function, the patch management module may give a prompt: it is recommended to perform a patching operation on the calling function existing in the patched function.

At step 82, the first piece of instruction code of the patched function is modified into jump instruction code, the jump instruction code is instruction code obtained by calculating according to the patched function and the relay space.

The jump instruction code includes a jump address, and the jump address is determined according to the difference between the patching function address and the relay space address. The relay space is set in advance by the patch management module. When the relay space is set, the target jump instruction code is written in the relay space, and the target jump instruction code is the instruction code obtained by calculating according to the relay space and the patching function; the target jump instruction code includes a target jump address, and the target jump address is determined according to the difference between the relay space address and the patching function address.

At step 83, the second piece of instruction code of the patched function is modified into Nop instruction code.

The second piece of instruction code of the current patched function is the breakpoint instruction code. Since the first piece of instruction code of the patched function including the delay slot is modified into the jump instruction code in step 82, the jump instruction code will be executed first when the kernel call stack calls the patched function, and the breakpoint instruction code will not be executed.

At step 84, a jump from the relay space to the patching function is implemented in the relay space.

There is target jump instruction code for jumping from the relay space address to the patching function address set in the relay space. When the kernel call stack calls the patched function, a jump to the relay space is done by means of the first piece of instruction code, i.e., the jump instruction code, of the patched function, and a jump from the relay space to the patching function is implemented in the relay space.

Taking FIG. 8*b* as an example, the steps of the method for implementing LINUX kernel hot patch in FIG. 8*a* will be described in detail. First, the second piece of instruction code INSN_1 of the patched function is modified into breakpoint instruction code BRK, so that the breakpoint exception is executed according to the breakpoint instruction code BRK during the thread execution process; secondly, the first piece of instruction code INSN_0 of the patched function is modified into jump instruction code J_XXX. The jump instruction code J_XXX is the instruction code obtained by calculating according to the patched function and the relay space. According to the jump instruction code J_XXX, a jump can be done from the patched function to the relay space. The relay space includes a jump register, and target jump instruction code is written in the jump register. The target jump instruction code is instruction code obtained by calculating according to the relay space and patching function. Therefore, in the relay space, it is possible to jump from the relay space to the patching function to realize the activation of the patching function. Finally, the second piece of instruction code of the patched function is modified into the Nop instruction code.

The method for implementing LINUX kernel hot patch provided by the embodiment of the present disclosure is applicable to a patched function with a branch delay slot attribute. First, the second piece of instruction code of the patched function is modified into breakpoint instruction code, and the breakpoint exception is executed according to the breakpoint instruction code during the thread execution process. Secondly, the first piece of instruction code of the patched function is modified into jump instruction code, and jumping indirectly from the patched function address to the patching function address can be done to realize the activation of the patching function.

It should be noted that, the breakpoint exception is registered before the header instruction of the patched function is modified, thus, after the first byte of the fixed instruction code is modified into the breakpoint instruction code, even if the breakpoint instruction code is encountered during the thread execution process, the breakpoint exception can be executed according to the breakpoint instruction code, and the thread will not be interrupted. That is, in the embodiment of the present disclosure, the modification process of the header instruction of the patched function realizes the logical atomic operation, and the LINUX system can activate the patching function without restarting, thereby realizing the LINUX kernel hot patch and ensuring the stability of the LINUX system.

It should also be noted that, the modification process of the header instruction of the patched function only involves the modification of two pieces of instruction code, the modification process is simple, and the modification process does not involve the backtracking of the kernel call stack, which improves the efficiency of implementing LINUX kernel hot patch.

Figure 9A:
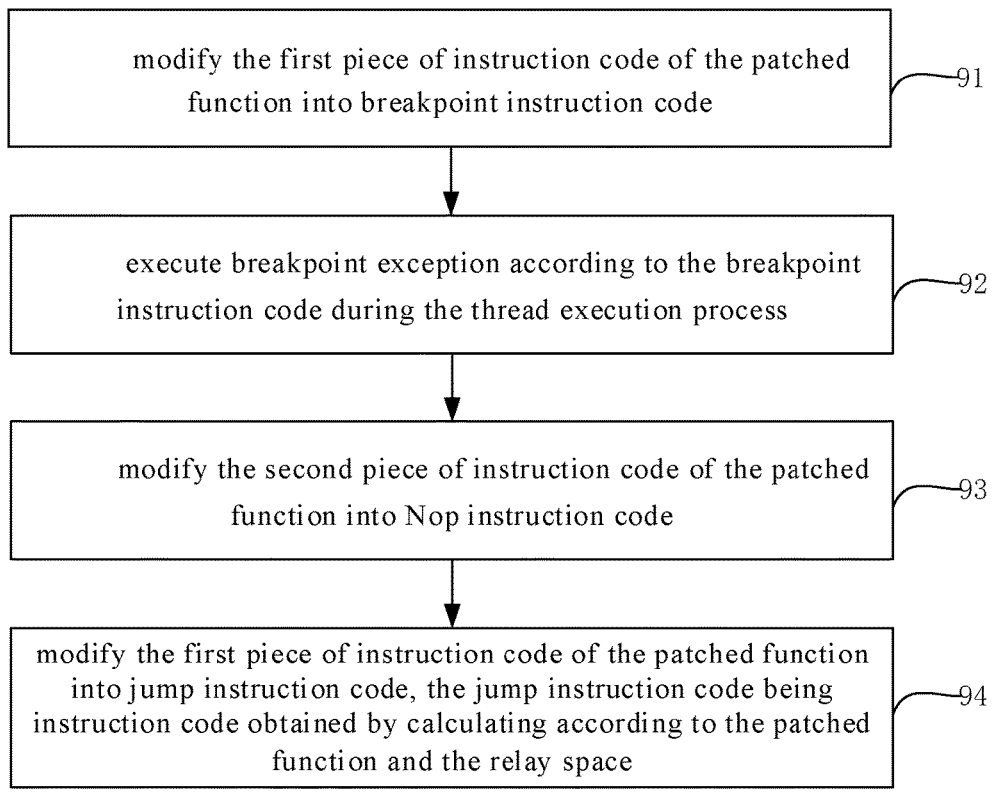
FIG. 9a is a flowchart of a method for implementing LINUX kernel hot patch according to an embodiment of the present disclosure.

FIG. 9a is a flowchart of a method for implementing LINUX kernel hot patch according to an embodiment of the present disclosure. This method for implementing LINUX kernel hot patch is aimed at the RISC architecture with a branch delay slot attribute, that is, the instructions of the patched function include the delay slot, and the instructions in the delay slot are preferentially executed during the thread execution process. In order to reduce the instructions involved in modifying the patched function as much as possible, before modifying the header instruction of the patched function, a relay space for the patched function is applied for. The relay space is a code segment space reserved in the kernel and/or the kernel modules that can implement a jump from the patched function by one piece of instruction, and the relay space is initialized by the patch management module.

As shown in FIG. 9a, the method for implementing LINUX kernel hot patch is applicable for the case where the first piece of instruction of the patched function does not contain a delay slot, and the method includes steps 91 to 94.

At step 91, the first piece of instruction code of the patched function is modified into breakpoint instruction code.

The breakpoint instruction code can intercept the thread of calling the patched function by the kernel call stack.

It should be noted that, since the first piece of instruction of the current patched function does not contain a delay slot, when the kernel call stack calls the patched function, the instruction code in the delay slot will be executed first, and then the first piece of instruction code of the patched function will be executed. Therefore, in order to intercept the thread of calling the patched function by the kernel call stack, the first piece of instruction code of the patched function is modified into the breakpoint instruction code.

It should be noted that, modifying the first piece of instruction code of the patched function into the jump instruction code is to perform a patching operation on the patched function and realize activation of the patching function. Therefore, in some embodiments, before modifying the first piece of instruction code of the patched function into the jump instruction code, it is judged whether the patching operation can be performed on the patched function.

In an implementation, the assembly instruction code of the patched function is parsed, and it is judged whether there is an instruction code sequence for jumping to the beginning of the patched function in the assembly instruction code. If there is an instruction code sequence for jumping to the beginning of the patched function, it indicates that the patching operation cannot be performed on the patched function, thus stopping modifying the header instruction code of the patched function; if there is no instruction code sequence for jumping to the beginning of the patched function, it indicates that the patching operation can be performed on the patched function, that is, the first piece of instruction code of the patched function can be modified into the jump instruction code to activate the patching function. It should be noted that, in all functions, the probability that there is an instruction code sequence for jumping to the beginning of the patched function in the assembly instruction code is extremely low.

In an implementation, when the header instruction code of the patched function is stopped from being modified due to an instruction code sequence for jumping to the beginning of the patched function existing in the patched function, the patch management module may give a prompt: it is recommended to perform a patching operation on the calling function existing in the patched function.

At step 92, breakpoint exception is executed according to the breakpoint instruction code during the thread execution process.

The breakpoint exception is an operation triggered by a breakpoint during the execution of the thread, and the operation is registered in the patch management module. When the operation is registered, a corresponding operation process is hooked by modifying the corresponding register context; where, modifying the corresponding register context includes writing the patching function into the register.

In an implementation, the operation process of the hooking includes: judging whether it is currently in the process of modifying the instruction code, if it is not in the process of modifying the instruction code, then performing the original breakpoint standard kernel process; if it is in the process of modifying the instruction code, then judging whether a patching operation is being performed on the function that currently has the breakpoint, if the patching operation is not being performed, performing the original breakpoint standard kernel process; if the patching operation is currently being performed, jumping to the register to which the patching function is written.

At step 93, the second piece of instruction code of the patched function is modified into Nop instruction code.

It should be noted that, if there is a kernel call stack, the kernel call stack is calling the patched function, and the thread of calling the patched function has executed the first piece of instruction code when the patched function is not modified, then, at this time, modifying the second piece of instruction code of the patched function to the Nop instruction code will result in instruction code sequence incompatibility, that is, the first piece of instruction code executed by the thread of the kernel call stack is the original instruction code of the patched function, while the second piece of instruction code is the modified instruction code. In order to prevent the instruction code sequence incompatibility, before modifying the second piece of instruction code of the patched function to the Nop instruction code, it is determined whether the address of the second piece of instruction code is traversed by the kernel stack, that is, it is determined whether the second piece of instruction code is being executed. When the second piece of instruction code is not being executed, the second piece of instruction code of the patched function will be modified into the Nop instruction code.

Figure 10:
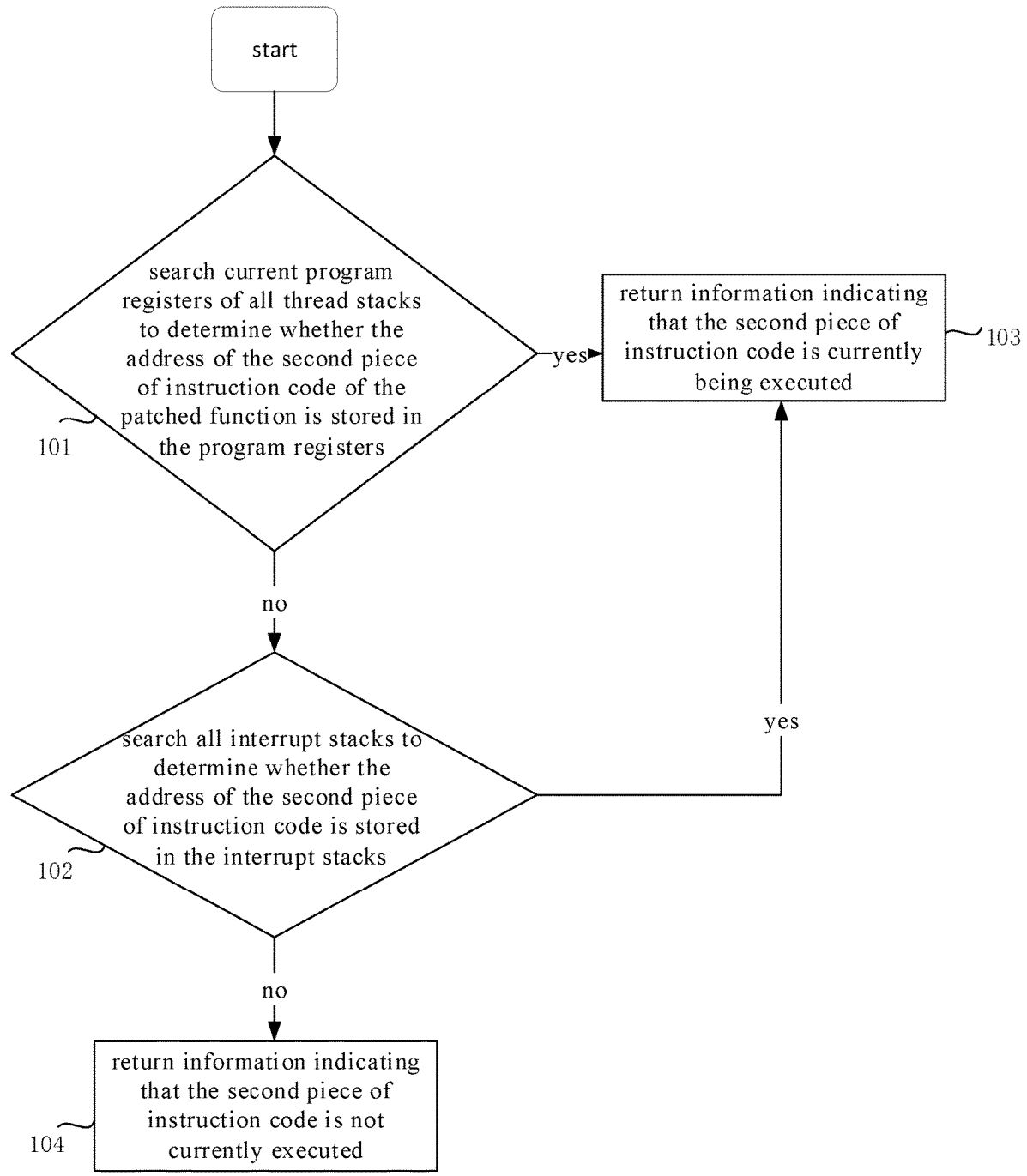
FIG. 10 is a flowchart of a method for determining whether the address of the second piece of instruction code of a patched function is traversed by the kernel stack according to an embodiment of the present disclosure.

In an implementation, as shown in FIG. 10, the step of determining whether the address of the second piece of instruction code of the patched function is traversed by the kernel stack includes steps 101 to 104.

At step 101, the current program registers of all thread stacks are searched to determine whether the address of the second piece of instruction code of the patched function is stored in the program registers; if the program register of any thread stack has the address of the second piece of instruction code stored therein, then step 103 is executed; if none of the program registers of all thread stacks stores the address of the second piece of instruction code, then step 102 is executed.

At step 102, all interrupt stacks are searched to determine whether the address of the second piece of instruction code is stored in the interrupt stacks; if any interrupt stack has the address of the second piece of instruction code stored therein, then step 103 is executed; if none of the interrupt stacks stores the address of the second piece of instruction code, then step 104 is executed.

At step 103, information indicating that the second piece of instruction code is currently being executed is returned.

At step 104, information indicating that the second piece of instruction code is not currently executed is returned.

At step 94, the first piece of instruction code of the patched function is modified into jump instruction code, the jump instruction code is instruction code obtained by calculating according to the patched function and the relay space.

Target jump instruction code for jumping from the relay space address to the patching function address is set in the relay space; the target jump instruction code includes a target jump address, and the target jump address is determined according to the difference between the relay space address and the patching function address.

Taking FIG. 9b as an example, the steps of the method for implementing LINUX kernel hot patch in FIG. 9a will be described in detail. First, the first piece of instruction code INSN_0 of the patched function is modified into breakpoint instruction code BRK, so that the breakpoint exception is executed according to the breakpoint instruction code BRK during the thread execution process; secondly, the second piece of instruction code INSN_1 of the patched function is modified into Nop instruction code. Then, the breakpoint instruction code BRK is modified into jump instruction code J_XXX. The jump instruction code J_XXX is obtained by calculating according to the patched function and the relay space. According to the jump instruction code J_XXX, a jump can be done from the patched function to the relay space. The relay space includes a jump register, and target jump instruction code is written in the jump register. The target jump instruction code is instruction code obtained by calculating according to the relay space and patching function. Therefore, in the relay space, it is possible to jump from the relay space to the patching function to realize the activation of the patching function.

Figure 11A:
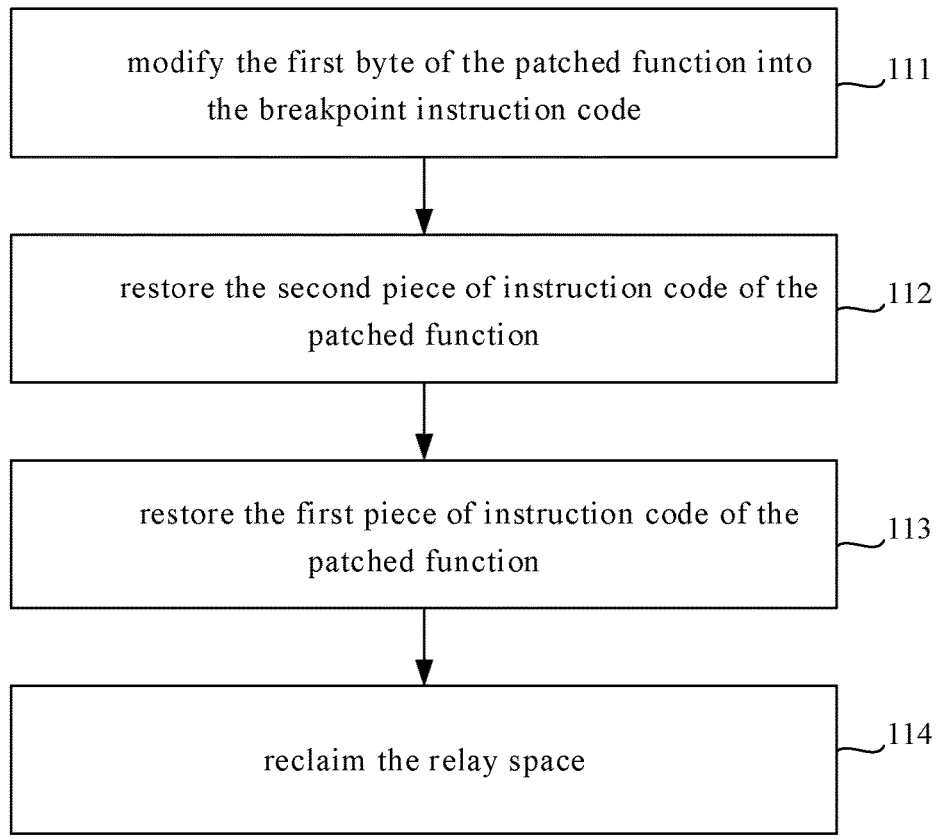
FIG. 11a is a flowchart of a method for removing an activated patching function according to an embodiment of the present disclosure.

In an implementation, as shown in FIG. 11a, the steps of removing the activated patching functions corresponding to FIGS. 8a and 9a includes steps 111 to 114.

At step 111, the first byte of the patched function is modified into the breakpoint instruction code.

At step 112, the second piece of instruction code of the patched function is restored.

At step 113, the first piece of instruction code of the patched function is restored.

At step 114, the relay space is reclaimed.

Figure 8B:
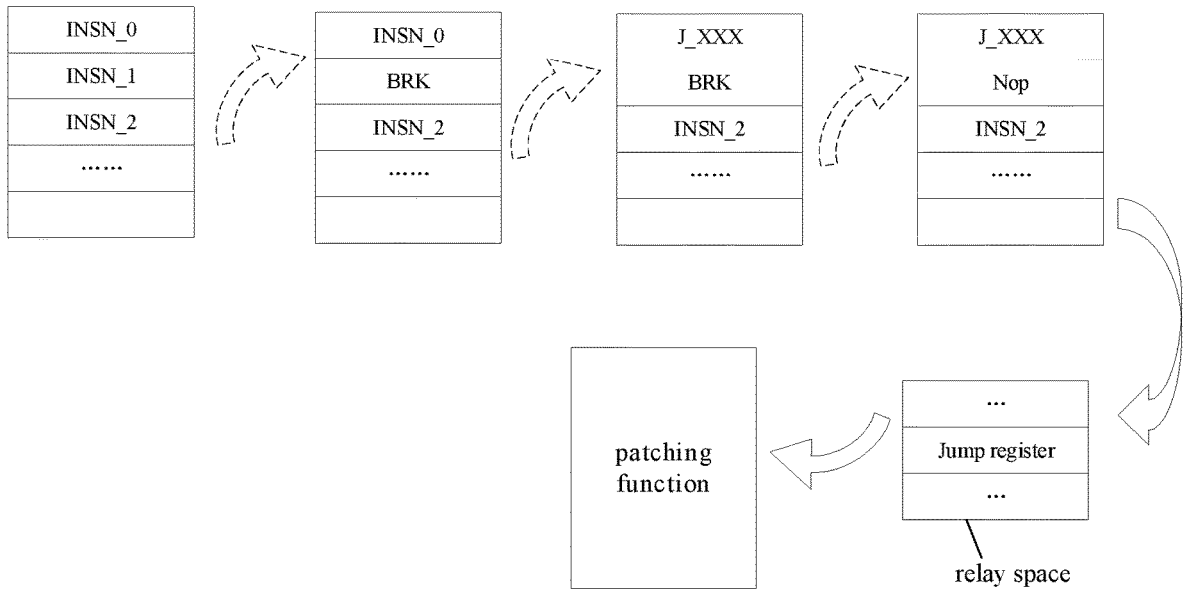
FIG. 8b is a schematic diagram of a method for implementing LINUX kernel hot patch according to an embodiment of the present disclosure.
Figure 9B:
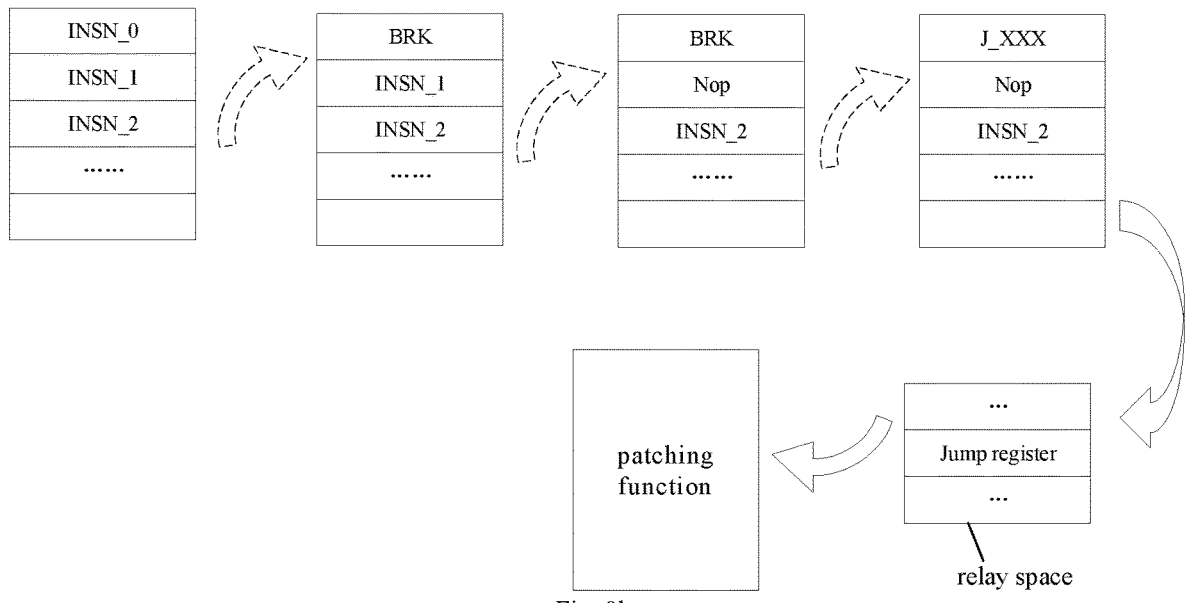
FIG. 9b is a schematic diagram of a method for implementing LINUX kernel hot patch according to an embodiment of the present disclosure.
Figure 11B:
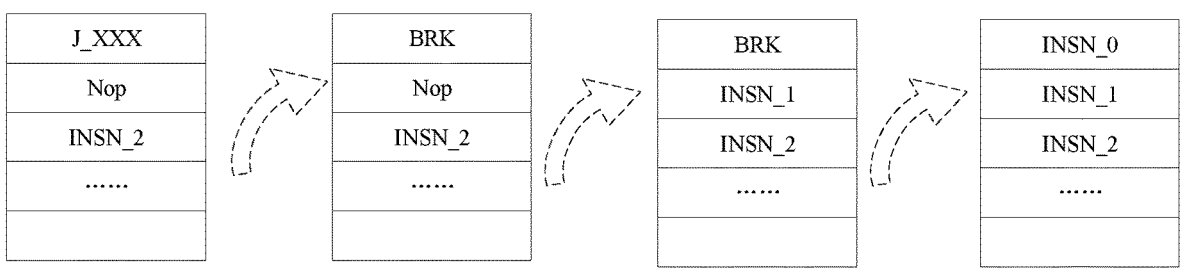
FIG. 11b is a schematic diagram of a method for removing an activated patching function according to an embodiment of the present disclosure.

Taking FIG. 11b as an example, the steps of removing the patching function activated in FIGS. 8b and 9b are correspondingly described. First, the first byte of the patched function is modified into the breakpoint instruction code BRK, and the breakpoint exception is executed according to the breakpoint instruction code during the thread execution process. It should be noted that the first byte of the patched function at this time is the jump instruction J_XXX. Next, the second piece of instruction code of the patched function is restored. At this time, the second piece of instruction code of the patched function is the Nop instruction code, and restoring the second piece of instruction code of the patched function is to restore the Nop instruction code to the INSN_1 instruction code. Finally, the first piece of instruction code of the patched function is restored, that is, the breakpoint instruction code BRK is modified into the INSN_0 instruction code. At this point, the thread resumes the calling to the patched function, and the patch functions activated in FIGS. 8b and 9b are successfully removed.

Figure 12:
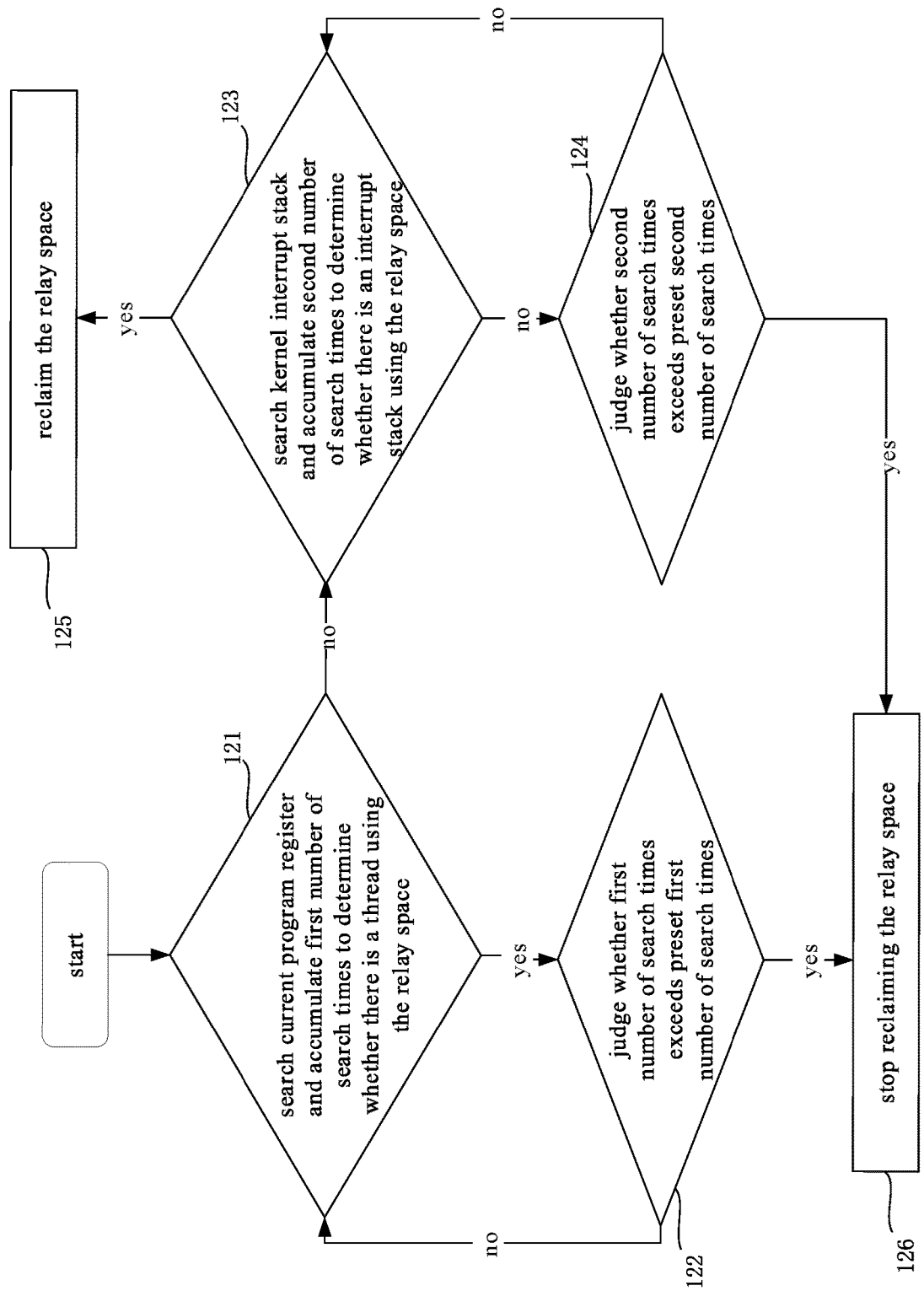
FIG. 12 is a flowchart of a backtracking method of relay space according to an embodiment of the present disclosure.

It should be noted that, after restoring the first piece of instruction code of the patched function in step 113, the calling to the patching function has been disconnected, but the relay space may continue to be used. Therefore, in some embodiments, the relay space is backtracked before it is reclaimed, and when backtracking is performed, the patched function address is used as the key value to perform a search to judge whether the relay space is still being used. As shown in FIG. 12, the steps of performing the relay space backtracking include steps 121 to 126.

At step 121, the current program register is searched for and the first number of search times is accumulated to determine whether there is a thread using the relay space, if there is a thread using the relay space, then step 122 is executed; if there is no thread using the relay space, then step 123 is executed.

At step 122, it is judged whether the first number of search times exceeds the preset first number of search times, if it exceeds the preset first number of search times, then step 126 is executed; if it does not exceed the preset first number of search times, then step 121 is executed.

At step 123, the kernel interrupt stack is searched for and the second number of search times is accumulated to determine whether there is an interrupt stack using the relay space, if there is a thread using the relay space, then step 124 is executed; if there is no thread using the relay space, then step 125 is executed.

At step 124, it is judged whether the second number of search times exceeds the preset second number of search times, if it exceeds the preset second number of search times, then step 126 is executed; if it does not exceed the preset second number of search times, then the process returns to step 123.

At step 125, the relay space is reclaimed.

At step 126, reclaiming the relay space is stopped.

The method for implementing LINUX kernel hot patch provided by the embodiment of the present disclosure is applicable to a patched function with a branch delay slot attribute. First, the first piece of instruction code of the patched function is modified into breakpoint instruction code, and the breakpoint exception is executed according to the breakpoint instruction code during the thread execution process. Secondly, the first piece of instruction code of the patched function is modified into jump instruction code, and jumping indirectly from the patched function address to the patching function address can be done to realize the activation of the patching function.

It should be noted that, the breakpoint exception is registered before the header instruction of the patched function is modified, thus, after the first byte of the fixed instruction code is modified into the breakpoint instruction code, even if the breakpoint instruction code is encountered during the thread execution process, the breakpoint exception can be executed according to the breakpoint instruction code, and the thread will not be interrupted. That is, in the embodiment of the present disclosure, the modification process of the header instruction of the patched function realizes the logical atomic operation, and the LINUX system can activate the patching function without restarting, thereby realizing the LINUX kernel hot patch and ensuring the stability of the LINUX system.

It should also be noted that, the modification process of the header instruction of the patched function only involves the modification of two pieces of instruction code, the modification process is simple. Moreover, the modification process involves only the backtracking of the program register and the interrupt stack, and does not involve the backtracking of the kernel call stack, which improves the efficiency of implementing LINUX kernel hot patch.

In a second aspect, an embodiment of the present disclosure provides an electronic device which includes: one or more processors; and a storage means having stored thereon one or more programs which, when executed by the one or more processors, cause the one or more processors to implement any of the aforementioned methods for implementing LINUX kernel hot patch.

In a third aspect, an embodiment of the present disclosure provides a computer readable medium having stored thereon a program which, when executed by a processor, implements any of the aforementioned methods for implementing LINUX kernel hot patch.

It will be understood by those of ordinary skill in the art that all or some of the steps in the methods, the systems, and the functional modules/units in the devices as disclosed above can be implemented as software, firmware, hardware, and appropriate combinations thereof. In a hardware implementation, the division between functional modules/units mentioned in the above description does not necessarily correspond to the division of physical components; for example, one physical component may have multiple functions, or one function or step may be implemented by several physical components cooperatively. Some or all physical components may be implemented as software executed by a processor, such as a central processing unit, digital signal processor or microprocessor, or may be implemented as hardware, or may be implemented as an integrated circuit, such as an application specific integrated circuit. Such software may be distributed on a computer readable medium, which may include a computer storage medium (or a non-transitory medium) and a communication medium (or a transitory medium). As known to those of ordinary skill in the art, the term computer storage medium includes both volatile and nonvolatile, removable and non-removable media implemented in any method or technology for storage of information such as computer readable instructions, data structures, program modules or other data. The computer storage medium includes, but is not limited to, RAM, ROM, EEPROM, flash memory or other memory technology, CD-ROM, digital versatile disk (DVD) or other optical disk storage, magnetic cartridge, magnetic tape, magnetic disk storage or other magnetic storage device, or may any other medium that can be used to store desired information and can be accessed by a computer. In addition, the communication medium typically contains computer readable instructions, data structures, program modules, or other data in a modulated data signal such as a carrier wave or other transport mechanism, and can include any information delivery medium, as is well known to those of ordinary skill in the art.

Exemplary embodiments have been disclosed herein, and although specific terms are employed, they are only used and should only be construed in a general descriptive sense and not for purposes of limitation. In some instances, it will be apparent to those skilled in the art that features, characteristics and/or elements described in connection with a particular embodiment may be used alone or in combination with features, characteristics and/or elements described in other embodiments, unless expressly stated otherwise. Accordingly, it will be understood by those of ordinary skill in the art that various changes in form and details may be made therein without departing from the scope of the present disclosure as set forth in the appended claims.

What is claimed is:

1. A method for implementing LINUX kernel hot patch, comprising:
    modifying header instruction code of a patched function in an atomic operation mode, and jumping directly or indirectly from a patched function address to a patching function address to activate a patching function,
    wherein the method further comprises:
    adding fixed instruction code of X bytes before a first piece of instruction code of the patched function; wherein X is an integer greater than 4; the first piece of instruction code is the header instruction code;
    modifying a first byte of the fixed instruction code into breakpoint instruction code;
    executing breakpoint exception according to the breakpoint instruction code during a thread execution process;
    modifying a return execution address of the breakpoint instruction code into a jump address;
    modifying the breakpoint instruction code into a jump instruction.

2. The method of claim 1, wherein, before the adding fixed instruction code of X bytes before the first piece of instruction code of the patched function, the method further comprises:
    judging whether fixed instruction code is set before the first piece of instruction code of the patched function, and if so, stopping modifying the header instruction code of the patched function.

3. An electronic device, comprising:
    one or more processors;
    a storage means having stored thereon one or more programs which, when executed by the one or more processors, cause the one or more processors to implement the method of claim 1.

4. A non-transitory computer readable medium having stored thereon a program which, when executed by a processor, implements the method of claim 1.

* * * * *